(12) United States Patent
Mariyani et al.

(10) Patent No.: US 11,751,046 B1
(45) Date of Patent: Sep. 5, 2023

(54) METHOD AND SYSTEM FOR OPTIMIZING DEVICE RETRY BEHAVIOR

(71) Applicant: T-Mobile Innovations LLC, Overland Park, KS (US)

(72) Inventors: Anil Kumar Mariyani, Ashburn, VA (US); Chris Jensen, Snoqualmie, WA (US); Patrick D. Wilson, Denver, CO (US)

(73) Assignee: T-Mobile Innovations LLC, Overland Park, KS (US)

( * ) Notice: Subject to any disclaimer, the term of this patent is extended or adjusted under 35 U.S.C. 154(b) by 185 days.

(21) Appl. No.: 17/223,159

(22) Filed: Apr. 6, 2021

(51) Int. Cl.
  H04W 8/30  (2009.01)
  H04W 8/24  (2009.01)
  H04W 24/04 (2009.01)

(52) U.S. Cl.
  CPC ............ *H04W 8/30* (2013.01); *H04W 8/24* (2013.01); *H04W 24/04* (2013.01)

(58) Field of Classification Search
  CPC .......... H04W 8/30; H04W 8/24; H04W 24/04
  See application file for complete search history.

(56) References Cited

U.S. PATENT DOCUMENTS

| | | | | |
|---|---|---|---|---|
| 8,031,603 | B1* | 10/2011 | Polk | H04L 1/0045 370/468 |
| 8,880,635 | B1* | 11/2014 | Singh | G06F 16/9574 709/219 |
| 2002/0170045 | A1* | 11/2002 | Hahn | G06F 9/5011 717/162 |
| 2014/0359379 | A1* | 12/2014 | Thakare | G06Q 20/356 714/57 |
| 2015/0319191 | A1* | 11/2015 | Georgiev | H04L 63/101 726/23 |
| 2016/0373332 | A1* | 12/2016 | Chakra | H04L 67/10 |
| 2020/0084742 | A1 | 3/2020 | Niemi et al. | |
| 2020/0220875 | A1* | 7/2020 | Harguindeguy | H04L 63/1425 |
| 2020/0233790 | A1* | 7/2020 | Battaglia | H04L 67/02 |
| 2022/0164299 | A1* | 5/2022 | Moshe | G06F 21/44 |

FOREIGN PATENT DOCUMENTS

WO    2019/194717 A1    10/2019

* cited by examiner

*Primary Examiner* — Dominic E Rego
(74) *Attorney, Agent, or Firm* — Jones Robb, PLLC

(57) ABSTRACT

Systems and methods are provided for controlling device retry behavior. The method is performed by receiving an error code generated in response to a resource request from the wireless device, associating the error code with a timeframe for reseeding the resource request from the wireless device, and sending the error code and the timeframe to the wireless device in response to the resource request.

17 Claims, 8 Drawing Sheets

METHOD AND SYSTEM FOR OPTIMIZING DEVICE RETRY BEHAVIOR

TECHNICAL BACKGROUND

A wireless network, such as a cellular network, can include a core network and a radio access network (RAN) serving multiple wireless devices or user equipment (UE) in a geographical area covered by a radio frequency transmission provided by the access network. As technology has evolved, different carriers within the cellular network may utilize different types of radio access technologies (RATs). RATs can include, for example, third generation (3G) RATs (e.g., WCDMA, UMTS, CDMA etc.), fourth generation (4G) RATs (e.g., WiMax, LTE, etc.), and fifth generation (5G) RATs (new radio (NR)).

The evolution of 5G RATs has resulted in significant network architectural developments. For example, the 5G core network offers a serviced based architecture (SBA). The 5G core network is delivered through a set of interconnected network functions (NFs). The NFs are able to access the services of the other NFs in the core network. This is contrast to the 4G LTE evolved packet core, which implemented a fixed-function, hard-wired architecture.

In order to request services in a wireless network, UEs or wireless devices send a request over the RAN. The requests may be handled by components of the core network. For example, in the 5G network, the request may be evaluated based on a subscriber profile in a unified data repository (UDR). If the requested services are unavailable to the requesting subscriber, the unified data management (UDM) or authentication server function (AUSF) may respond with an error code, which reaches the AMF. The AMF may then notify the requesting UE or wireless device of the error code. Upon receiving the error code, the wireless device or UE may continue to request services. The decision of how long to wait before re-sending a request for services may be configured on a UE basis. Thus, UEs from different manufacturers may wait different amounts of time before re-initiating the request for services. Repeated requests for services that are unavailable to the UE can cause excessive network congestion, thus impacting the overall quality of network services for connected devices. Repeated requests negatively impact key performance indicators (KPIs), flood error logs, and impact fault, configuration, accounting, performance, security. (FCAPS) functionality.

Thus, a solution is needed for optimizing UE retry behavior in order to improve network performance. Such a solution should aim to minimize repeated retries and repeated sending of error codes in response to UE requests for resources, while allowing transmission of requests that are likely to be successful in order to enhance the network quality of service (QoS).

Overview

Exemplary embodiments include a method for controlling device retry behavior. The method includes receiving a resource request from a wireless device and evaluating an error code generated in response to the resource request from wireless device. The method additionally includes associating the error code with a timeframe for reseeding the resource request from the wireless device and sending the error code and the timeframe to the wireless device in response to the resource request.

Further embodiments include a system for controlling device retry behavior. The system includes a mobility management core function or component receiving a resource request over an access network from a wireless device, the mobility management core component communicating with other core components or functions to generate an error code in response the resource request. The system additionally includes a device retry controller consulting a database storing a table associating error codes with a timeframe for resending the resource request. The device retry controller sends the error code and the timeframe to the wireless device in response to the resource request.

In a further exemplary embodiment, a method is provided for controlling device retry behavior. The method includes generating an error code in response to a wireless device resource request, associating the error code with a timeframe for resending the wireless device resource request, and preventing a wireless device from re-sending the wireless device resource request for the associated timeframe.

DETAILED DESCRIPTION

Figure 1:
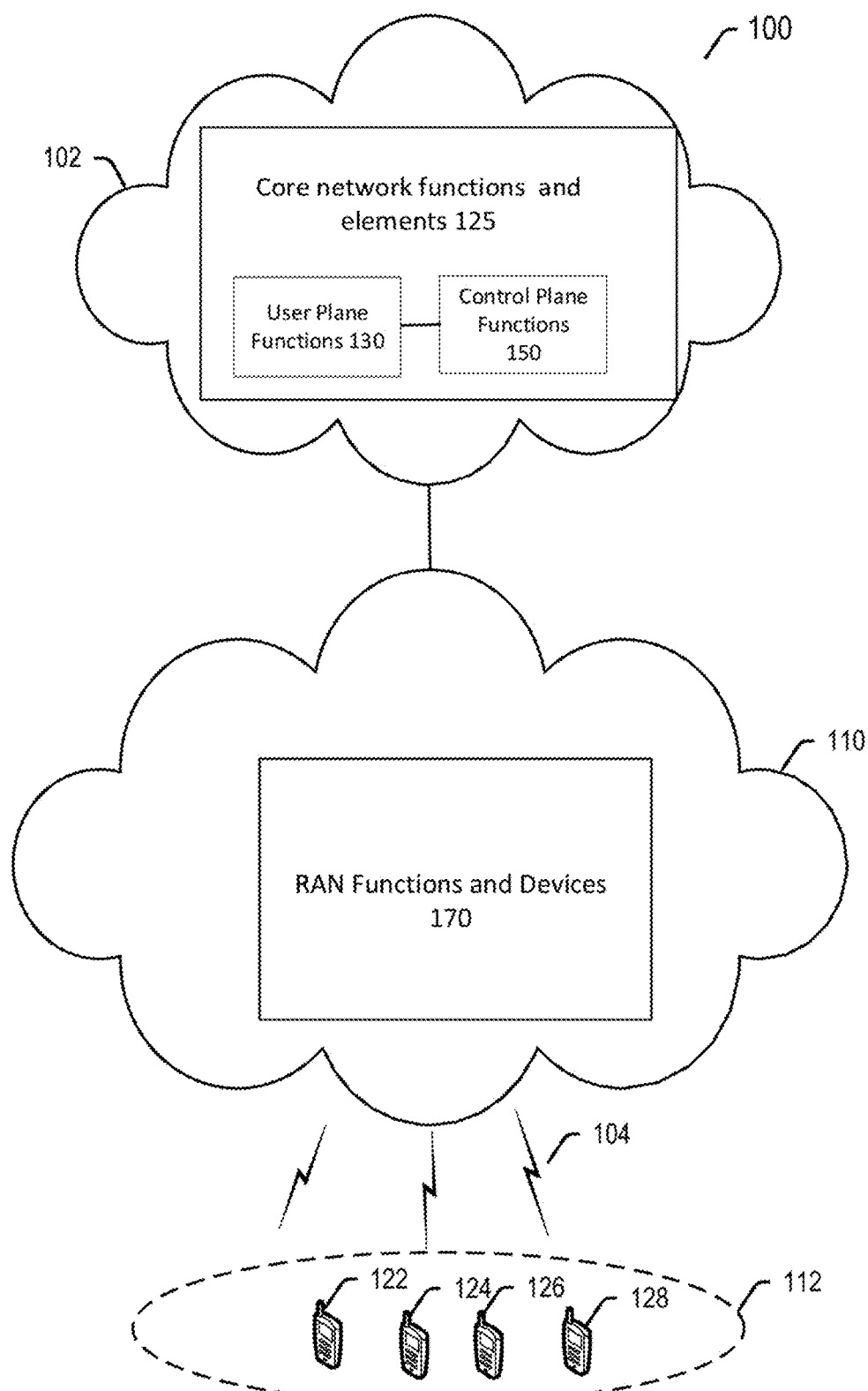
FIG. 1 depicts an exemplary system for wireless communication, in accordance with the disclosed embodiments.

Exemplary embodiments described herein include systems, methods, and components for controlling device retry behavior. Embodiments disclosed herein include a device retry controller, which determines a restricted time period for prohibiting wireless devices from re-sending a resource request. Specifically, the device retry controller operates upon learning that an initial device resource request resulted in an error code. Based on the error code, the device retry controller determines a restricted time period and sets a back-off timer. The device retry controller sends the error code and a value of the back-off timer to the wireless device.

Additionally, the device retry controller may store or access a table, wherein the table includes a set of error codes, each with a corresponding back-off timer value. In embodiments set forth herein, the device retry controller may configure the table based on network conditions and may modify the table according to changing network conditions. The back-off timer values for each error code may be determined periodically for each error code based on a network loading and configuration.

In embodiments set forth herein, the device retry controller may be incorporated in a core function of a 5G core network. For example, the device retry controller may be incorporated in the AMF of a core network. Thus, the core network function, such as the AMF, is able to control the impact of each error code on each wireless device in order to improve network performance. In embodiments set forth herein, a back-off timer value is configurable for each error code. The error codes may include, for example 5G mobility management (MM) cause codes and hypertext transfer protocol (HTTP) error codes. In embodiments set forth herein, a default value may be set for the error codes prior to individually configuring the back-off timer for each error code. For example, the default back-off timer value may be set to 24 hours and depending upon the error code, the corresponding back-off timer value may be set to a value greater than or less than 24 hours. For example, for some error codes, the back-off timer value may be set to one hour. For other error codes, the back-off timer may be set to 72 hours.

As a result of a request for resources from a wireless device, the device retry controller, which may be incorporated in the AMF or be in communication with the AMF, may become aware that other core functions have generated an error code. In response to notification of the error code, the device retry controller may look up the corresponding back-off timer value for the error code. Upon determining the corresponding back-off timer value, the device retry controller sends the error code and the back-off timer value to the requesting wireless device. Through this process, the wireless device is prohibited from retry attempts for a time period equal to the back-off timer value. This process operates to control excessive retry behavior in a core network having a SBA.

FIG. 1 depicts an exemplary system 100 for wireless communication, in accordance with the disclosed embodiments. The system 100 may include a core network 102, a radio access network (RAN) 110 and multiple wireless devices 122, 124, 126, and 128 able to communicate within the network. The wireless devices 122, 124, 126, and 128 may be end-user wireless devices and may operate within one or more coverage areas 112 and communicate with the RAN 110 over communication links 104, which may for example be 5G NR communication links, 4G LTE communication links, or any other suitable type of communication link.

Figure 2:
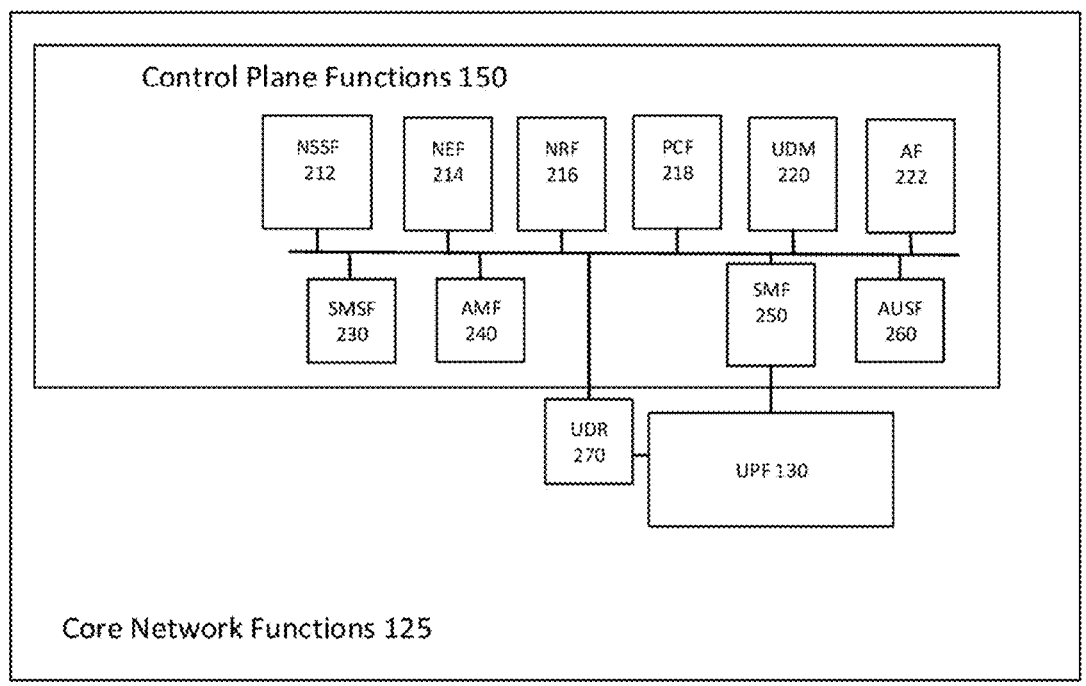
FIG. 2 illustrates an exemplary configuration of core network components and functions in accordance with disclosed embodiments.

The core network 102 includes core network functions and elements 125. As set forth above, the core network may be structured using a service-based architecture (SBA). The network functions 125 may be separated into user plane functions 130 and control plane functions 150. Service-based interfaces may be utilized between control-plane functions, while user-plane functions connect over point-to-point links. The device retry controller further described herein may be implemented as or integrated with one of the core network functions and elements 125. FIG. 2, which is further described below, illustrates further details of the core network functions and elements 125.

The RAN 110 may include various access network functions and devices. The RAN functions and devices 170 are disposed between the core network 102 and the end-user wireless devices 122, 124, 126, 128. Some of the functions and devices 170 may communicate directly with the core network 102 and others may communicate directly with the end user wireless devices 122, 124, 126, 128. Further, the elements and devices 170 may communicate with one another within the RAN in order to provide services from the core network 102 to the end-user wireless devices 122, 124, 126, and 128.

The RAN 110 includes at least an access node (or base station), such as an eNodeB, a next generation NodeB (gNodeB) communicating with a plurality of end-user wireless devices. It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

Access nodes can be, for example, standard access nodes such as a macro-cell access node, a base transceiver station, a radio base station, an eNodeB device, an enhanced eNodeB device, a next generation NodeB (or gNodeB) in 5G New Radio ("5G NR"), or the like. As will be further described below, access nodes may include combinations of centralized units (CUs), distributed units (DUs) and radio units (RUs). In additional embodiments, access nodes may comprise two co-located cells, or antenna/transceiver combinations that are mounted on the same structure. Alternatively, access nodes may comprise a short range, low power, small-cell access node such as a microcell access node, a picocell access node, a femtocell access node, or a home eNodeB device.

Access nodes can be configured to deploy at least two different carriers, each of which utilizes a different RAT. For example, a first carrier may be deployed by an access node in an LTE mode, and a second carrier may be deployed by an access node in an NR mode. Thus, in an embodiment, the access node may comprise two co-located cells, or antenna/transceiver combinations that are mounted on the same structure. In some embodiments, multiple access nodes may be deployed and each access node may support a different RAT. For example, a gNodeB may support NR and an eNodeB may provide LTE coverage. Any other combination of access nodes and carriers deployed therefrom may be evident to those having ordinary skill in the art in light of this disclosure.

The access nodes can comprise a processor and associated circuitry to execute or direct the execution of computer-readable instructions to perform operations such as those further described herein. Access nodes can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof.

The wireless devices 122, 124, 126, and 128 may include any wireless device included in a wireless network. For example, the term "wireless device" may include a relay node, which may communicate with an access node. The term "wireless device" may also include an end-user wireless device, which may communicate with the access node in the access network 110 through the relay node. The term "wireless device" may further include an end-user wireless device that communicates with the access node directly without being relayed by a relay node.

Wireless devices 122, 124, 126, and 128 may be any device, system, combination of devices, or other such communication platform capable of communicating wirelessly with RAN 110 using one or more frequency bands and wireless carriers deployed therefrom. Each of wireless devices 122, 124, 126, and 128, may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. The wireless devices may be or include high power wireless devices or standard power wireless devices. Wireless devices may also include Internet of Things (IoT) devices. Other types of communication platforms are possible.

System 100 may further include many components not specifically shown in FIG. 1 including processing nodes, controller nodes, routers, gateways, and physical and/or wireless data links for communicating signals among various network elements. System 100 may include one or more of a local area network, a wide area network, and an internetwork (including the Internet). Communication network 100 may be capable of communicating signals and carrying data, for example, to support voice, push-to-talk, broadcast video, and data communications by end-user wireless devices 122, 124, 126, and 128. Wireless network protocols may include one or more of Multimedia Broadcast Multicast Services (MBMS), code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). System 100 may include additional base stations, controller nodes, telephony switches, internet routers, network gateways, computer systems, communication links, or other type of communication equipment, and combinations thereof.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between the access network 110 and the core network 102.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

The operations for device retry controller may be implemented as computer-readable instructions or methods, and processing nodes on the network for executing the instructions or methods. The processing node may include a processor included in the access node or a processor included in any controller node in the wireless network that is coupled to the access node.

FIG. 2 illustrates an exemplary configuration of core network functions and elements 125 in accordance with disclosed embodiments. The control plane functions 150 may include, for example a Network Slice Selection Function (NSSF) 212, a Network Exposure Function (NEF) 214, a Network Repository Function (NRF) 216, a Policy Control Function PCF (218), a Unified Data Management (UDM) function 220, an Application Function (AF) 222, a Short Message Service Function (SMSF) 230, an Access and Mobility Function (AMF) 240, a Session Management Function (SMF) 250, and an Authentication Server Function (AUSF) 260. Further, a Unified Data Repository (UDR) 270 may provide unified data storage accessible to both control plane functions 150 and user plane functions 130.

Additional or fewer control plane functions 150 may also be included. Control plane functions can provide one or more NF based on a request-response or subscribe-notify model. The core network functions and elements 125 as illustrated form a micro services based architecture, which may include network functions distributed over different cloud infrastructures. Additionally, many services may span different network functions and domains that work in unison.

The user plane function (UPF) 130 performs operations such as, packet routing and forwarding, packet inspection, policy enforcement for the user plane, QoS handling, etc. When compared with 4G EPC, the functions of the UPF 130 resemble those of the SGW-U (Serving Gateway User Plane function) and PGW-U (PDN Gateway User Plane function).

The NRF 216, which is a control plane function, maintains the list of available network functions and their profiles. The NRF 216 maintains an updated repository of the network components along with services provided by each of the elements in the core network. The NRF 216 additionally provides a discovery mechanism that allows the elements to discover each other. The NRF 216 provides a registration function that allows each network function to register a profile and a list of services with the NRF 216. It also performs services registration and discovery so that different network functions can find each other. As an example, the SMF 250, which is registered to NRF 216 becomes discoverable by the AMF 240 when a UE or other device tries to access a service type served by the SMF 250. The NRF 216 broadcasts available services once they are registered in the 5G core. To use other network functions, registered functions can send service requests to the NRF 216.

The UDR 270 may be a repository shared between control plane functions 150 and the UPF 130. The UDR 270 may include information about subscribers, application-specific data, and policy data. The UDR 270 can store structured data that can be exposed to an NF.

The UDM 220 interfaces with NFs such as AMF 240 and SMF 250 so that relevant data becomes available to AMF 240 and SMF 250. The UDM 220 generates authentication vectors when requested by the AUSF 260, which acts as an authentication server.

In embodiments disclosed herein, the AMF 240 may include a device retry controller 500, described further below with respect to FIG. 3, that controls retry behavior of connected wireless devices requesting services from the core network. The AMF 240 performs the role of access point to the 5G core, thereby terminating RAN control plane and UE traffic originating on either the N1 or N2 reference interface. In the 5G core, the functionality of the 4G Mobility Management Entity (MME) is decomposed into the AMF 240 and the SMF 250. The AMF 240 receives all connection and session related information from the UE using N1 and N2 interfaces, and is responsible for handling connection and mobility management tasks.

Figure 3:
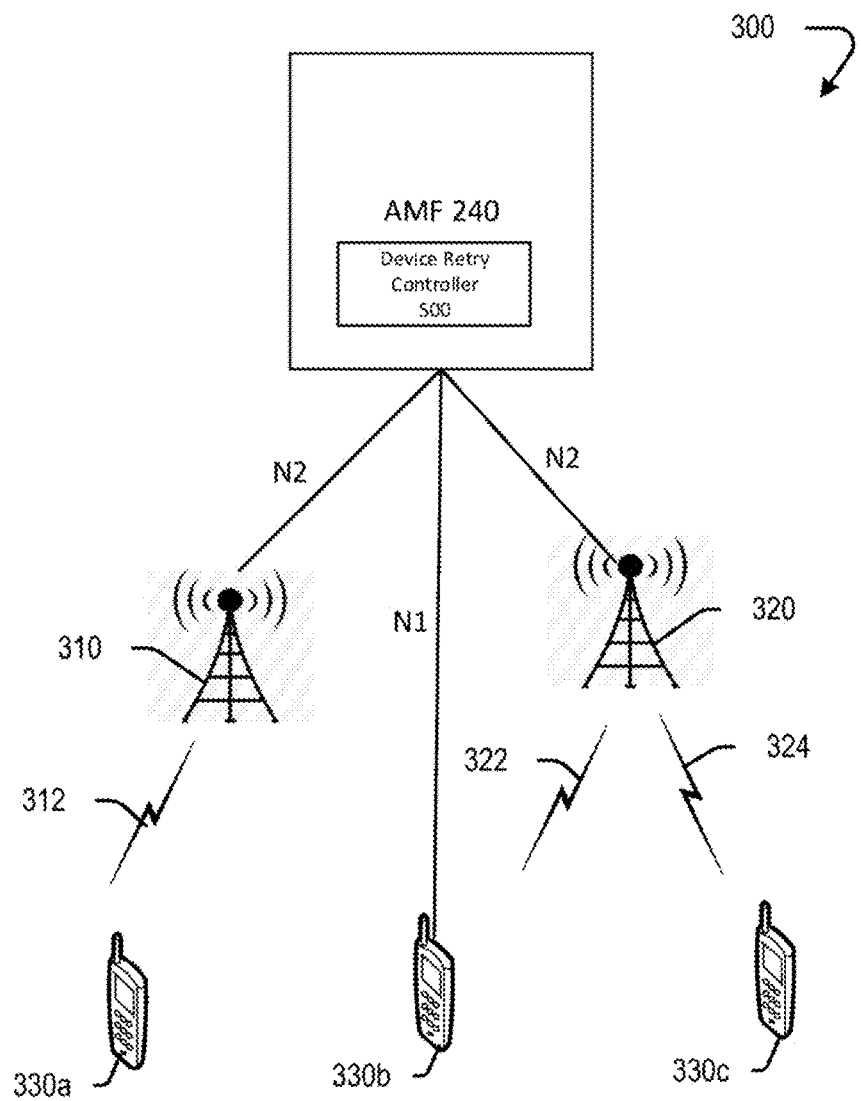
FIG. 3 is a block diagram illustrating a system for controlling device retry behavior in accordance with the disclosed embodiments.

FIG. 3 is a block diagram illustrating a further embodiment of interaction of device retry controller 500 with a RAN. An AMF 240 may incorporate a device retry controller 500 in order to control retry behavior of wireless devices 330a, 330b, and 330c. The AMF 240 may communicate with access nodes 310, 320 and wireless devices 330, 330b, and 330c over N1 and N2 interfaces. Further wireless devices 330a, 330b, and 330c may communicate with access nodes 310, 320 over wireless communication links 312, 322, and 324. The N1 interface is a transparent interface from 5G-UE to AMF 240. The N2 interface supports control plane signaling between the RAN including the access nodes 310 and 320 and the 5G core covering scenarios related to UE context management, and session/resource management procedures.

The device retry controller 500 may interact with these components as well as core network components in order to control wireless device retry behavior. The device retry controller 500 may also be a VNF and may and may operate within a processing node such as that shown in FIG. 5. The device retry controller 500 may determine periodically, back-off times for all error codes, and may store in a database each error code with a corresponding value of a back-off timer. In real time, the device retry controller 500 may be notified of an error code generated as a result of a UE request and may determine a corresponding back-off timer upon consulting the database. The device retry controller 500 may then forward the error code and the corresponding back-off timer value to the requesting UE. Accordingly, the device retry controller may minimize retries by UEs as well as transmission of error codes and thereby may reduce congestion and improve the QoS throughout the network.

The access nodes 310 and 320 may include combinations of RUs. DUs, and CUs. The CU generally is centralized so as to control the operation of several DUs. The DUs are juxtaposed near the RUs and may in some instances be integrated with the RUs, which communicated with UEs. The CU is the centralized unit that runs the Radio Resource Control (RRC) and Packet Data Convergence Protocol (PDCP) layers. An access node 310, 320, such as a gNodeB may include a CU and one DU connected to the CU by different interfaces for the control plane and user plane. In some instances, the CU may interface with multiple DUs to support multiple gNodeBs. The split architecture enables a 5G network to utilize different distribution of protocol stacks between CU and DUs depending on mid-haul availability and network design. The CU may be a logical node that includes the gNodeB functions like transfer of user data, mobility control, RAN sharing, positioning, etc. The CU may control the operation of several DUs over the mid-haul interface. The RU may be a radio unit that handles the digital front end (DFE) and the parts of the physical (PHY) layer and digital beamforming functionality. The DU is a distributed unit that sits close to the RU. In embodiments, the DU runs the Radio Link Control (RLC), Media Access Control (MAC) layer, and parts of the PHY layer. This DU may also include a subset of the eNodeB/gNodeB functions and its operation may be controlled by a CU.

Figure 4:
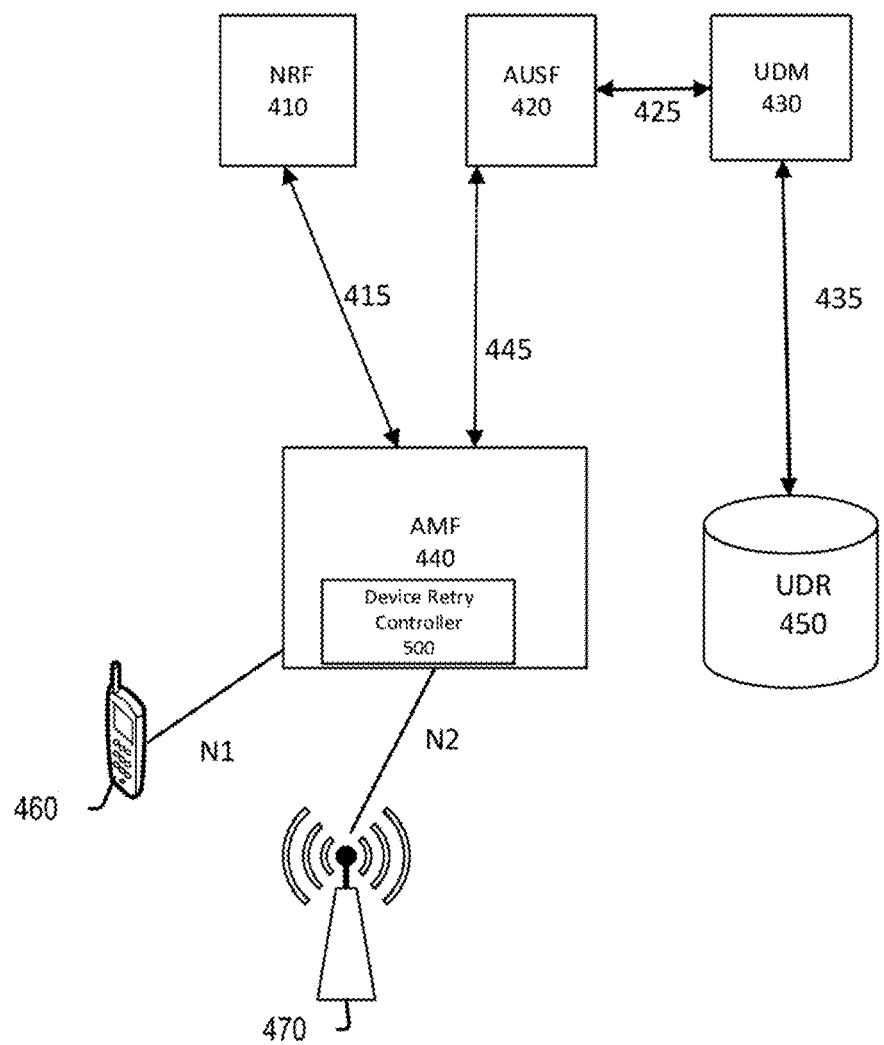
FIG. 4 is a flow diagram illustrating interaction of components for controlling device retry behavior in accordance with disclosed embodiments.

FIG. 4 is a flow diagram 400 depicting flow between components in an embodiment of the device retry controller 500. Core network components including AMF 440, NRF, 410, AUSF 420 and UDM 430 operate in conjunction with UDR 450 to respond to requests from wireless device 460. The AMF 440 includes the device retry controller 500 and operates to communicate with the wireless device 460 over the N1 interface and access network 470 over the N2 interface. In operation, upon receiving a request from the wireless device 460, the AMF 440 performs discovery at 415 with the NRF 410. Further, the AMF 440 authenticates at 445 through interaction with the AUSF 420. The AUSF 420 communicates with the UDM 430 at 425 to send an authentication request and receive an authentication response. In order to generate the response, the UDM 430 communicates with the UDR 450 at 435. In some instances, when the request for resources from the wireless device 460 cannot be granted, an error code will be received from the UDR 450 at 435.

Error codes may be, for example HTTP cause codes. The device retry controller 500 or network operator stores multiple back-off timer values. Some of the values may be a default value, e.g., 24 hours, and other values may be set individually based on the error code and network conditions. Each HTTP cause code may be stored in conjunction with one of the back-off timer values. For example, a 401 "unauthorized" error may be used when authentication is required and has either failed or has not yet been provided. The 401 unauthorized error may have a corresponding back-off timer value of 24 hours, 12 hours, 1 hour, or other value set based on network parameters. A 404 "Not Found" error indicates that the requested resource could not be found but may be available in the future. The 404 "not found" error may likewise have a corresponding back-off timer value of 24 hours, 12 hours, one hour, or other value. Other exemplary errors with HTTP status codes are shown in Table 1 below. Each error may be associated with a corresponding back-off timer value.

TABLE 1

| Application Error | HTTP status code | Description |
| --- | --- | --- |
| UNKNOWN_5GS_SUBSCRIPTION | 403 Forbidden | No 5GS subscription is associated with the user. |
| NO_PS_SUBSCRIPTION | 403 Forbidden | No PS (5GS, EPS, GPRS) subscription is associated with the user. |
| ROAMING_NOT_ALLOWED | 403 Forbidden | The subscriber is not allowed to roam within that PLMN. |
| USER_NOT_FOUND | 404 Not Found | The user does not exist in the HPLMN. |
| CONTEXT_NOT_FOUND | 404 Not Found | It is used when no corresponding context exists. |
| ACCESS_NOT_FOUND | 403 Forbidden | Access type not allowed for the user. |
| RAT_NOT_FOUND | 403 Forbidden | RAT is not allowed for the user |
| DNN_NOT_FOUND | 403 Forbidden | DNN not authorized for the user. |
| REAUTHENTICATION_REQUIRED | 403 Forbidden | Due to operator policies the user needs to be re-authenticated, e.g. last valid authentication is considered obsolete. |
| INVALID_GUAMI | 403 Forbidden | The AMF is not allowed to modify the registration information stored in the UDM, as it is not the registered AMF. |
| UNPROCESSABLE_REQUEST | 422 Unprocessable Entity | The request cannot be processed due to semantic errors when trying to process a patch method. |

With some errors, which are considered permanent, the device may be forbidden from attempting to re-connect. For example, a 410 "Gone" error indicates that the resource requested is no longer available and will not be available again. This may be a permanent error and the device may be forbidden from re-connecting. Thus, the device retry controller may not, in this case, locate a back-off timer value.

While the 4xx client error codes are discussed above, other codes, such as 3xx redirection codes, and 5xx server error codes may also be associated with back-off timer values. Accordingly, the device retry controller may transmit the back-off timer value in addition to the error information to the requesting device.

The error code may alternatively be or include a 5GMM cause code. For example, a Cause #3 error indicates an illegal wireless device and is sent to the wireless device when the network refuses service to the wireless device. The refusal may be based on an unacceptable wireless device identify or because the wireless device does not pass the authentication check. A further example of an 5GMM cause code is a Cause #9 error which indicates that a UE identity cannot be derived by the network. This 5GMM cause is sent to the UE when the network cannot derive the UE's identity. As a further example, a cause #10 error indicates an implicitly de-registered UE. This 5GMM cause is sent to the UE if the network has implicitly de-registered the UE. All of these 5GMM cause codes may be individually associated with a back-off timer value.

The error code may be transmitted from the UDM 430 to the AUSF 420 and back to the AMF 440. Upon receiving the error code at the AMF 440, the device retry controller 500 matches the error code with an existing stored back-off time value. As set forth above, the device retry controller 500 may access a stored table of all error codes with corresponding back-off time values. After matching the error code with a back-off time value, the device retry controller 500 may transmit both the error code and the back-off time value to the wireless device 460. Accordingly, the AMF 440 only sends the error code once to the wireless device 460 as the wireless device will be prevented from re-sending the request for a period of time equal to the back-off timer value.

Figure 5:
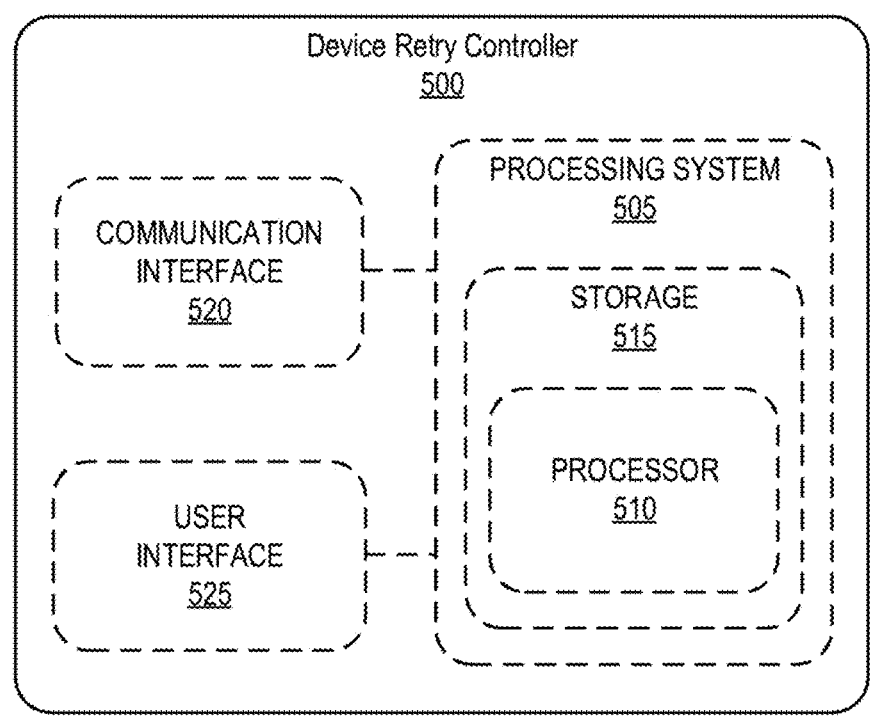
FIG. 5 depicts an exemplary configuration for a device retry controller in accordance with the disclosed embodiments.

FIG. 5 depicts an exemplary device retry controller 500, which may be configured to perform the methods and operations disclosed herein to provide centralized control of retry behavior of wireless devices in a wireless network. In disclosed embodiments, the device retry controller 500 may be included in the core network 102. Specifically, the device retry controller 500 may be included in or accessible to the AMF 440.

The device retry controller 500 may be configured for controlling device retry behavior when a device request cannot be granted. The device retry controller 500 may include a processing system 505. Processing system 505 may include a processor 510 and a storage device 515. Storage device 515 may include a disk drive, a flash drive, a memory, or other storage device configured to store data and/or computer readable instructions or codes (e.g., software). The computer executable instructions or codes maybe accessed and executed by processor 510 to perform various methods disclosed herein. Software stored in storage device 515 may include computer programs, firmware, or other form of machine-readable instructions, including an operating system, utilities, drivers, network interfaces, applications, or other type of software. For example, software stored in storage device 515 may include a module for performing various operations described herein. Processor 510 may be a microprocessor and may include hardware circuitry and/or embedded codes configured to retrieve and execute software stored in storage device 515.

The device retry controller 500 may include a communication interface 520 and a user interface 525. Communication interface 520 may be configured to enable the processing system 505 to communicate with other components, nodes, or devices in the wireless network. Communication interface 520 may include hardware components, such as network communication ports, devices, routers, wires, antenna, transceivers, etc. User interface 525 may be configured to allow a user to provide input to the device retry controller 500 and receive data or information from the device retry controller 500. User interface 525 may include hardware components, such as touch screens, buttons, displays, speakers, etc. The device retry controller 500 may further include other components such as a power management unit, a control interface unit, etc.

Figure 6:
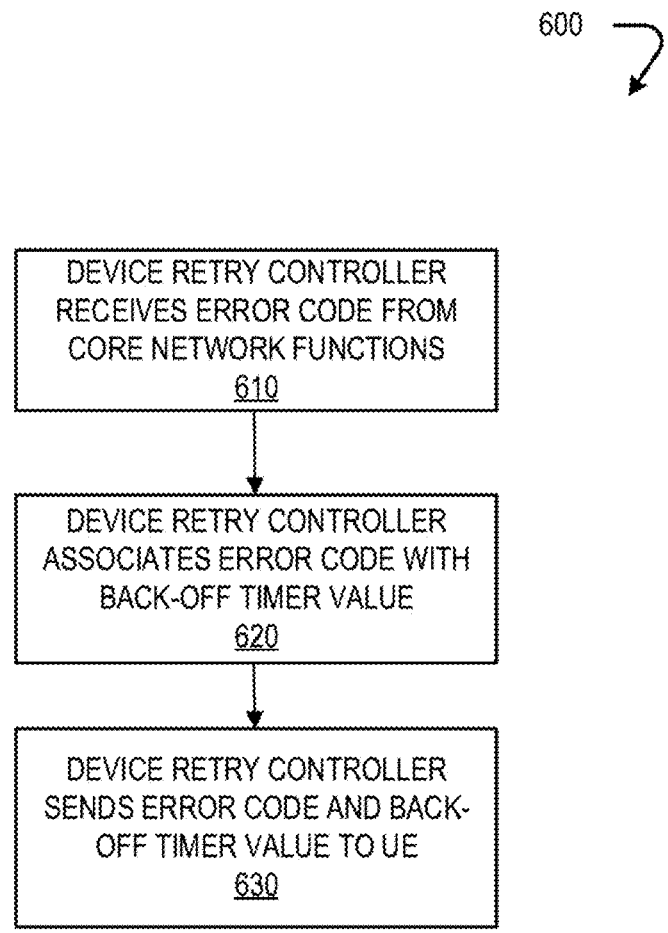
FIG. 6 is a flow chart depicting a method for controlling device retry behavior in accordance with disclosed embodiments.

The disclosed methods for operating the device retry controller 500 are further described below with respect to FIGS. 6-8. FIG. 6 is a flow chart depicting an exemplary method 600 for operating the device retry controller 500 in accordance with disclosed embodiments. Method 600 may be performed by any suitable processor discussed herein included in the device retry controller 500. For example, the processor may be or include the processor 510 shown in FIG. 5 as being incorporated in the device retry controller 500.

In step 610, the device retry controller 500 receives an error code from core network functions. The device retry controller 500 may be incorporated in the AMF and may receive the error code from the AUSF. Alternatively, the device retry controller 500 may be in communication with the AMF and may receive the error code from the AMF. request from an application.

In step 620, the device retry controller 500 associates the error code with a back-off timer value. For example, the device retry controller 500 may access a database including a table. The table may associate each error code with a corresponding back-off timer value. Accordingly, the device retry controller 500 may consolidate the error code with the corresponding back-off timer value and create a message for transmission to the wireless device.

In step 630, the device retry controller 500 sends the error code and the back-off timer value to the requesting wireless device. Accordingly, the wireless device is prohibited from sending the request again for a time period equal to the back-off timer value.

Figure 7:
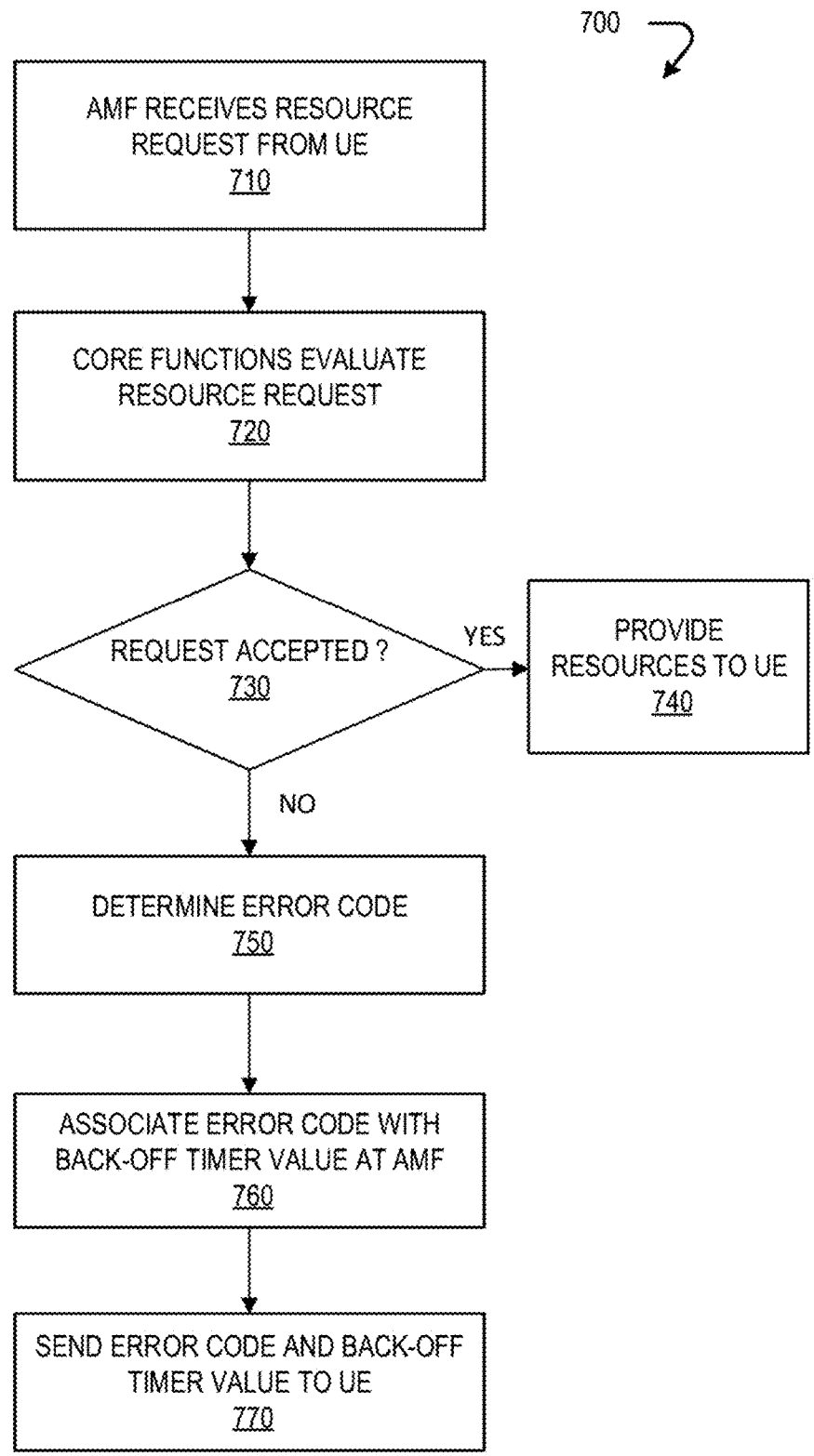
FIG. 7 is a flow chart depicting a further exemplary method for controlling device retry behavior in accordance with disclosed embodiments.

FIG. 7 is a flow chart depicting a further exemplary method 700 for operating the device retry controller 500. Method 700 may be performed by any suitable processor or combination of processors, for example, the processor 510 of the device retry controller 500 as shown in FIG. 5 or any combination of processors of the core network. Specifically, FIG. 7 illustrates steps performed in response to a request from a wireless device. In step 710, the AMF receives a resource request from a wireless device. In step 720, the core functions evaluation the request to determine if it can be granted. In step 730, if the request is granted or accepted, the core network provides resources to the requesting wireless device in step 740. However, if the request is not granted or accepted in step 730, the core components determine an error code in step 750. In step 760, the device retry controller 500 associates the error code with a corresponding back-off timer value and consolidates the error code with the back-off timer value. Finally, in step 770, the device retry controller 500 sends the error code and back-off timer value to the requesting wireless device. Thus, the wireless device will not attempt to re-send the request for a time period equal to the back-off timer value. Accordingly, unnecessary traffic in the network is reduced and network QoS is improved.

Accordingly, embodiments of the device retry controller 500 as set forth herein solve problems related to inconsistent device behavior with respect to error messages. Instead of having different wireless devices react differently to the same error message, all wireless devices will operate in accordance with the received back-off timer value selected by the device retry controller based on the error code.

Figure 8:
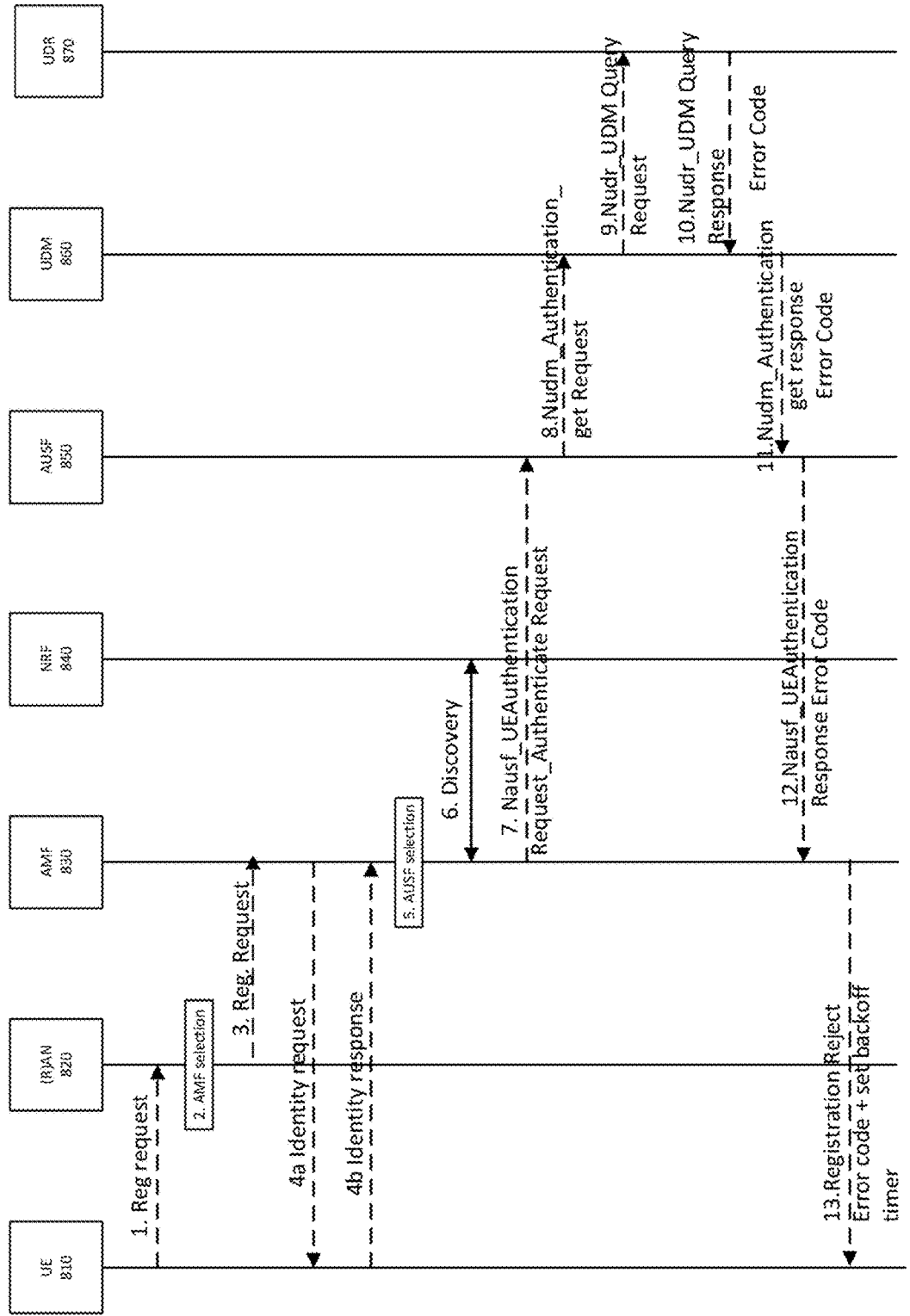
FIG. 8 is a flow diagram depicting a further exemplary embodiment for controlling device retry behavior.

FIG. 8 is a flow diagram illustrating flow between a wireless device or UE 810, RAN 820, and core network components including AMF 830, NRF 840, AUSF 850, UDM 860 and UDR 870. As illustrated, the UE 810 sends a request in step 1 through the RAN 820. In step 2, the RAN performs AMF selection. An AMF is selected by the access network to receive the UE registration request. The request message includes Network Slice Selection Assistance Information (NSSAI), which helps the core network determine the serving AMF. In step 3, the RAN 820 sends the request to the selected AMF 830 and steps 4a and 4b, the UE 810 and the AMF 830 perform identity request and response steps.

In step 5, the AMF 830 performs AUSF selection. The AMF 830 performs AUSF 850 selection to allocate an AUSF Instance that performs authentication. The AMF 830 may utilize the NRF 840 to discover the AUSF 850 instance. In step 6, the AMF 830 performs discovery with the NRF 840. In step 7, the AMF 830 sends an authentication request to the selected AUSF 850.

In step 8, the AUSF 850 sends a request to the UDM 860. In step 9, the UDM 860 queries the UDR 870. In step 10, the UDR 870 may respond to the UDM 860 with an error code. In step 11, the UDM 860 responds to the AUSF 850 with the error code and in step 12, the AUSF 850 responds with the error code to the AMF 830. The error code may be generated based on a subscriber profile state for the requesting UE that is stored in the UDR 870.

In step 13, the AMF 830, using the device retry controller 500 matches the error code with a back-off timer value and thus sets the back-off timer for the UE and sends both the error code and the back-off timer value to the UE 810.

In some embodiments, methods 600, 700, and 800 may include additional steps or operations. Furthermore, the methods may include steps shown in each of the other methods. As one of ordinary skill in the art would understand, the methods 600, 700 and 800 may be integrated in any useful manner and the steps may be performed in any useful sequence.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
receiving a resource request from a wireless device;
receiving an error code generated in response to the resource request from the wireless device;
associating the error code with a timeframe for resending the resource request from the wireless device; and
sending the error code and the timeframe to wireless device in response to the resource request.

2. The method of claim 1, further comprising receiving the resource request at an access and mobility management function (AMF) of a core network.

3. The method of claim 2, further comprising associating the error code with the timeframe at the AMF.

4. The method of claim 3, wherein the AMF sets a back-off timer to correspond to the timeframe.

5. The method of claim 4, wherein the AMF consults a table of error codes correlated with corresponding timeframes.

6. The method of claim 4, wherein the AMF sets the back-off timer based on the error code.

7. The method of claim 6, wherein the AMF sends a back-off timer value to the wireless device with the error code.

8. The method of claim 7, wherein the wireless device is restricted from re-sending the resource request within the timeframe.

9. The method of claim 2, further comprising receiving the error code at the AMF after consulting a unified data repository (UDR).

10. The method of claim 9, wherein the error code is generated based on a subscriber profile state in the UDR.

11. The method of claim 10, wherein the error code is a hypertext transfer protocol (HTTP) error code or a 5G mobility management (MM) cause code.

12. A system comprising:
a mobility management core component receiving a resource request over an access network from a wireless device;
multiple core components operating to generate an error code in response the resource request; and
a device retry controller communicating with the mobility management core component and associating the error code with a timeframe for resending the resource request by consulting a table associating multiple error codes with corresponding back-off timer values, the device retry controller sending the error code and the timeframe to the wireless device in response to the resource request.

13. The system of claim 12, wherein the mobility management core component is an access and mobility management function (AMF) of a core network.

14. The system of claim 13, wherein the device retry controller sets a back-off timer to correspond to the timeframe.

15. The system of claim 13, further comprising a unified data repository (UDR), wherein the ANI F consults the UDR to generate the error code.

16. The system of claim 15, wherein the error code is generated based on a subscriber profile state in the UDR.

17. The system of claim 12, wherein the wireless device is restricted from re-sending the resource request within the timeframe.

* * * * *